(12) United States Patent
George-Svahn et al.

(10) Patent No.: US 8,599,262 B2
(45) Date of Patent: Dec. 3, 2013

(54) IR CAMERA WITH IMPROVED PARAMETER INTERPRETATION AND IMAGE CONTROL

(75) Inventors: Erland George-Svahn, Solna (SE);
Rasmus Mattsson, Bagarmossen (SE);
Mikael Erlandsson, Uppsala (SE);
Torsten Sandbäck, Stockholm (SE)

(73) Assignee: Flir Systems AB, Taby (SE)

( * ) Notice: Subject to any disclaimer, the term of this patent is extended or adjusted under 35 U.S.C. 154(b) by 1037 days.

(21) Appl. No.: 12/426,872

(22) Filed: Apr. 20, 2009

(65) Prior Publication Data

US 2010/0265332 A1    Oct. 21, 2010

(51) Int. Cl.
*H04N 5/33* (2006.01)
(52) U.S. Cl.
USPC .......................................................... 348/164
(58) Field of Classification Search
USPC .......................................................... 348/164
See application file for complete search history.

(56) References Cited

U.S. PATENT DOCUMENTS

| 5,249,241 A * | 9/1993 | Silverman et al. ............ 382/169 |
| 5,631,465 A * | 5/1997 | Shepard ......................... 250/330 |
| 7,639,843 B2 * | 12/2009 | McManus et al. ............ 382/113 |
| 8,159,616 B2 * | 4/2012 | Norgaard ...................... 348/672 |
| 2008/0144905 A1 * | 6/2008 | Tallman ......................... 382/131 |
| 2010/0058222 A1 * | 3/2010 | Bergstrom et al. ........... 715/782 |

* cited by examiner

*Primary Examiner* — Christopher Biagini
(74) *Attorney, Agent, or Firm* — Haynes and Boone, LLP

(57) ABSTRACT

Embodiments of the invention relate to an IR camera for capturing thermal images of an imaged view, the IR camera comprising an IR camera display configured to display the captured thermal images to a user of the IR camera; a display control unit configured to control the IR camera display to further display a current temperature range of the IR camera. The IR camera is characterized in that the display control unit is configured to determine an indication scale comprising the entire current temperature range of the IR camera wherein equally sized temperature intervals have different geometric size in the indication scale based on upon the actual image content of the captured thermal image, and control the IR camera display to display the indication scale to a user of the IR camera. Embodiments of the invention further relate to a method for use in displaying captured thermal images of an IR camera and a computer-readable medium encoded with executable instructions for the same.

19 Claims, 8 Drawing Sheets

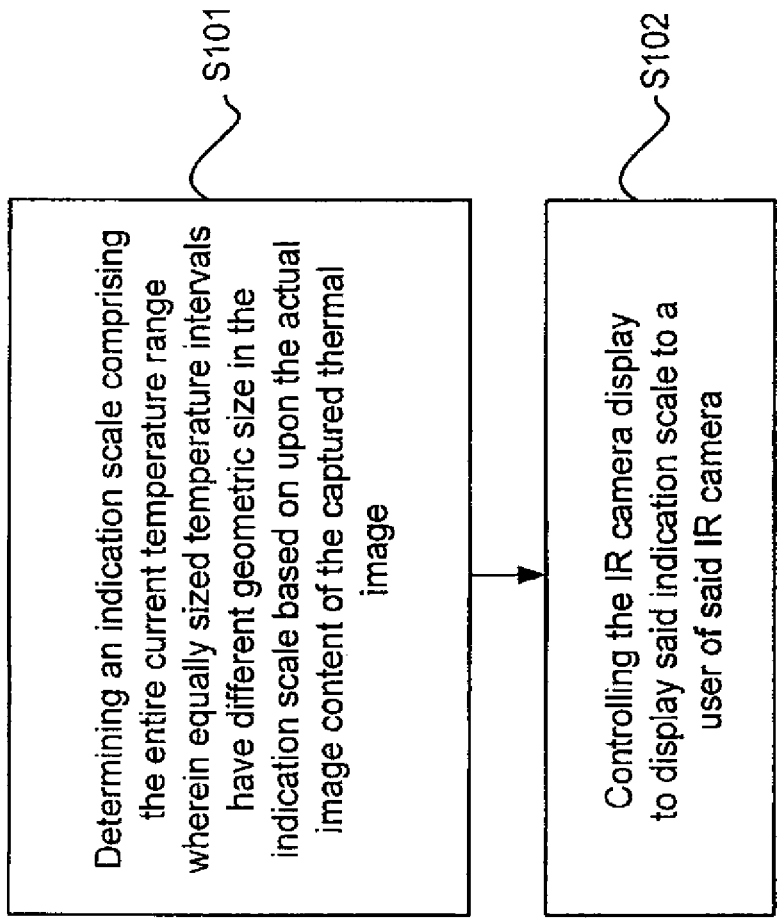
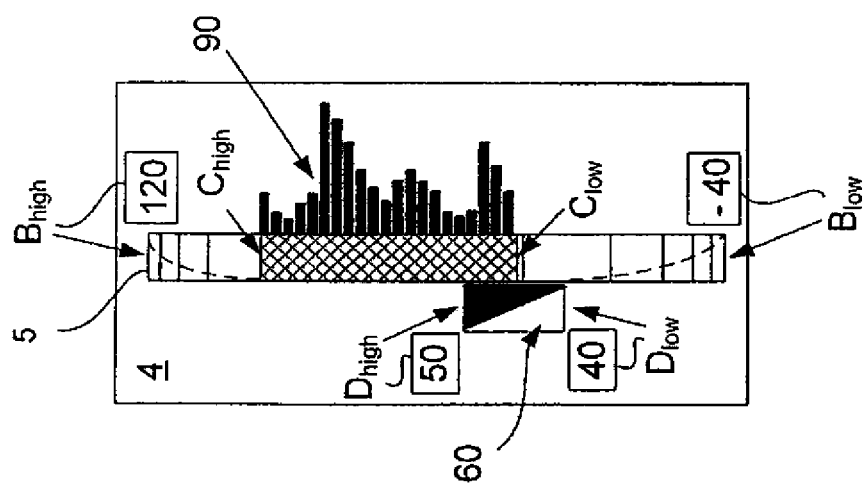
Fig. 9
Fig. 10

IR CAMERA WITH IMPROVED PARAMETER INTERPRETATION AND IMAGE CONTROL

FIELD

Embodiments of the invention relate in general to an IR camera, and in particular to an IR camera with an improved parameter interpretation and image control. The embodiments also relate to a method and a computer-readable medium encoded with executable instructions for improving the parameter interpretation and image control of an IR camera.

BACKGROUND

Infrared (IR) thermal cameras can be used in a number of different situations, for example, when inspecting or surveying complex electrical systems such as transformers, switchgears etc., or water carrying systems such as heat exchangers, radiators etc. IR cameras are used for capturing, displaying and storing thermal images. The thermal images may then be viewed and analyzed in order to, for example, find faulty electrical wirings or couplings, leaking water pipes, etc.

When viewing a thermal image captured by an IR camera in an IR camera display, there are a number of different parameters that determines how the thermal image is presented to the user of the IR camera. For example, these parameters may include colour scale values, isotherm levels/span, fusion thresholds/span for mixing thermal and conventional images, etc. Exactly how these parameters affect the actual displayed thermal image is subject to implementation specific solutions.

It is a common fact that users of IR cameras often experience problems with interpreting the content of displayed thermal images. Many parameters are also intuitively mistaken by the user to mean something else than what they actually represent. One reason for this is that the complex content of thermal images that lies behind the actual displayed thermal image are often hidden. This leaves several possible and arbitrary interpretations to be made from the displayed thermal images. Thus, there is a need for providing a user of an IR camera with an improved parameter interpretation and image control of the thermal images.

SUMMARY

A problem to which the embodiments of the invention relate is how to provide an IR camera with an improved parameter interpretation and image control.

This problem is addressed by an IR camera for capturing thermal images of an imaged view, the IR camera comprising an IR camera display configured to display the captured thermal images to a user of the IR camera, and a display control unit configured to control the IR camera display to further display the current temperature range, $B_{low}$ to $B_{high}$, of the IR camera. The IR camera is characterised in that the display control unit is configured to determine an indication scale comprising the entire current temperature range of the IR camera wherein equally sized temperature intervals have different geometric size in the indication scale based on upon the actual image content of the captured thermal image, and control the IR camera display to display the indication scale to a user of the IR camera.

The problem is also addressed by a method for use in displaying captured thermal images of an IR camera, the IR camera comprising an IR camera display configured to display the captured thermal images to a user of the IR camera, and a display control unit configured to control the IR camera display to further display the current temperature range of the IR camera. The method is characterized by the steps of: determining an indication scale comprising the entire current temperature range of the IR camera wherein equally sized temperature intervals have different geometric size in the indication scale based on upon the actual image content of the captured thermal image, and controlling the IR camera display to display the indication scale to a user of the IR camera.

The problem is further addressed by a computer-readable medium according to embodiments of the invention for use in displaying captured thermal images of an IR camera, which comprises computer readable code means, which when run in a display control unit in the IR camera causes said display control unit to perform the steps of: determining an indication scale comprising the entire current temperature range of the IR camera wherein equally sized temperature intervals have different geometric size in the indication scale based on upon the actual image content of the captured thermal image, and controlling the IR camera display to display the indication scale to a user of the IR camera.

By having a display control unit in an IR camera configured to, beside displaying the thermal image, determine and display a indicator scale of the entire current temperature range of the IR camera, wherein equally sized temperature intervals have different geometric size in the indication scale based on upon the actual image content of the captured thermal image, to which a user may relate the thermal image, the manmachine interface between the user of the IR camera and the IR camera is radically improved. The continuously determined and displayed indicator scale according to embodiments of the invention enables a user to more easily analyze and interpret the content of the captured thermal image, and intuitively and directly adjust, control and optimize the view parameter settings for a more clear and complete view of the current thermal image scene. Thus, the IR camera is provided with an improved parameter interpretation and image control.

An advantage of the above described embodiments is that it visualizes and helps the user of an IR camera to better understand the relationships between different parameters, while at the same time it eliminates the need to display the actual values of various parameters; such display of actual values will normally otherwise lead to a cluttered and incomprehensible display.

Another advantage of the above described embodiments of the invention is that it enables a new way of setting the temperature range of the IR camera in view of the actual thermal image content which previously has not been possible. Embodiments of the invention clearly visualises to the user of the IR camera for which temperature ranges of the IR camera the user will obtain an optimal view of the IR image in the IR camera display. This applies no matter if the setting of the temperatures is performed manually, semi-automatically or fully automatically.

A further advantage of the above described embodiments of the invention is that it provides a direct and intuitive use of control devices of an IR camera, which are used when setting different view parameters. The control devices of the IR camera may, for example, be a joystick, a scroll wheel, buttons or any combination thereof. However, embodiments of the invention are particularly advantageous if the control device is implemented as a touch screen in the IR camera display. Embodiments of the invention then add an improved granularity in the desired temperature range.

A further advantage of the above described embodiments of the invention is that it may provide the same functionalities for both radiometric and non-radiometric IR cameras, i.e. temperature measuring IR cameras and solely temperature colouring IR cameras.

Preferably, the indication scale may be determined such that the geometric size of equally sized temperature intervals is at its maximum within the actual image content of the captured thermal image, and decreases towards both ends of the indication scale. The indication scale may also be determined such that the temperature intervals in the actual image content of the captured thermal image are linearly distributed and/or such that the temperature intervals of the indication scale which is outside the actual image content are non-linearly distributed. The non-linearly distributed temperature levels of the indication scale may, for example, be approximated using second grade equations. The indication scale may further be determined such that only temperature intervals of the indication scale which are outside the actual image content comprises equally sized temperature intervals which have different geometric size in the indication scale.

Preferably, the display control unit of the IR camera may also be configured to associate the actual image content of the captured thermal image with the indication scale, and control the IR camera display to display said actual image content range of the captured thermal image in relation to indication scale. This feature further improves parameter interpretation and image control of the IR camera.

Preferably, the display control unit of the IR camera may further be configured to associate at least one view parameter setting, which determine how the captured thermal image is presented to the user of said IR camera, with said indication scale in the IR camera display, and control the IR camera display to display said at least one view parameter setting in relation to said indication scale. The view parameter setting may, for example, be colour scale levels and/or span, isotherm levels and/or spans, or fusion thresholds and/or span for mixing thermal and visual light images. This feature further provides a direct and intuitive setting of different view parameters to the user of the IR camera.

Preferably, the display control unit of the IR camera may further be configured to associate a thermal image histogram, which indicates the temperature distribution within the actual image content, with the actual image content and the indication scale, and control the IR camera display to display said thermal image histogram in relation to the actual image content and the indication scale. This feature further provides a direct and intuitive interpretation of a histogram to the user of the IR camera.

Further advantageous embodiments of the method and the computer-readable medium are set forth in the dependent claims, which correspondingly describe further advantageous embodiments of the invention.

BRIEF DESCRIPTION OF THE DRAWINGS

The objects, advantages and effects as well as features of embodiments of the invention will be more readily understood from the following detailed description of exemplary embodiments of the invention when read together with the accompanying drawings, in which:

FIG. 9 is another further illustration of an operation of an IR camera according to an exemplary embodiment of the invention.

FIG. 10 is a flowchart illustrating a method according to an exemplary embodiment of the invention.

DETAILED DESCRIPTION

Figure 1:
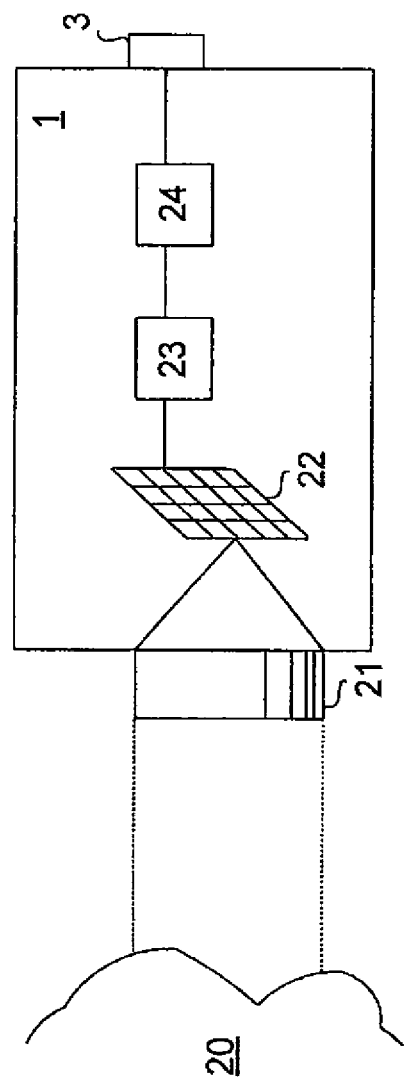
FIG. 1 shows an IR camera according to embodiments of the invention.

FIG. 1 shows an IR camera 1 for capturing thermal images of an imaged view, and present the thermal images to a user via an IR camera display 3. The IR camera 1 may further comprise at least one lens arrangement 21, a detector 22, a signal conditioning and processing unit 23 and a display control unit 24.

The incoming radiation to the IR camera 1 is focused by at least one lens arrangement 21 onto the detector 22. The detector 22 may typically be a matrix of detector elements, each of which may detect radiation from a corresponding area on an object 20, for example, a wall, water pipes, electrical connectors, etc., that is being imaged. The detector 22 may, for example, be a focal plane array (FPA). From the detector 22, the thermal image signal comprising temperature measurement data may be fed to a signal conditioning and processing unit 23. The signal conditioning and processing unit 23 may perform conventional signal conditioning, such as, for example, corrections for the inherent offset, gain drift, etc. The conditioned thermal image signal may then be sent from the signal conditioning and processing unit 23 to a display control unit 24.

The display control unit 24 is configured to receive the thermal image signal from the signal conditioning unit 23. The display control unit 24 is configured to control an IR camera display 3, for example, a viewfinder, a digital display and/or touch screen provided on the IR camera housing. The display control unit 24 is configured to perform the necessary adjustments to the thermal image signals and to the view parameter settings of the IR camera display 3 before and as the thermal image is shown in the IR camera display 3. The adjusted thermal images recorded by the IR camera 1 can then be seen in the IR camera display 3, and thus be presented to a user of the IR camera 1. The thermal images may be thermal image video and/or still thermal images. The operation of the display control unit 24 in the IR camera 1 according to embodiments of the invention is described in more detail in the exemplary embodiments presented below with reference to FIGS. 3-10.

Furthermore, the IR camera 1 may also comprise visible light optics 12 in order to also capture visible light data of the IR imaged view 2. This visual imaging part may be used by the display control unit 24 to merge visual image data with the IR image data from the IR imaging part in order to create a fusion image comprising both IR and visible light data. The display control unit 24 may then present the fusion image in the IR camera display 3. IR image fusion parameters, also commonly referred to as thermal fusion thresholds, may be used to control the mixing of thermal images and visible light images. Visible light images may also be referred to as conventional images.

It should be noted that the signal conditioning and processing unit 23 and the display control unit 24 may be provided as one physical unit, or alternatively as a plurality of logically interconnected units. The signal conditioning and processing unit 23 and the display control unit 24 may also comprise logic for performing the functionality of the IR camera 1. This functionality may be implemented partly by means of a software or computer program. The signal conditioning and processing unit 23 and the display control unit 24 may also comprise storage means, or a memory unit for storing such a computer program, and processing means or a processing unit, such as a microprocessor, for executing the computer program. The storage means may also be readable storage medium separated from, but connected to the signal conditioning and processing unit 23 and the display control unit 24. When, in the following, it is described that the IR camera 1, the signal conditioning and processing unit 23 or the display control unit 24 performs a certain function it is to be understood that the signal conditioning and processing unit 23 and/or the display control unit 24 may use the processing means to execute a certain part of the program which is stored in the storage means.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 11:
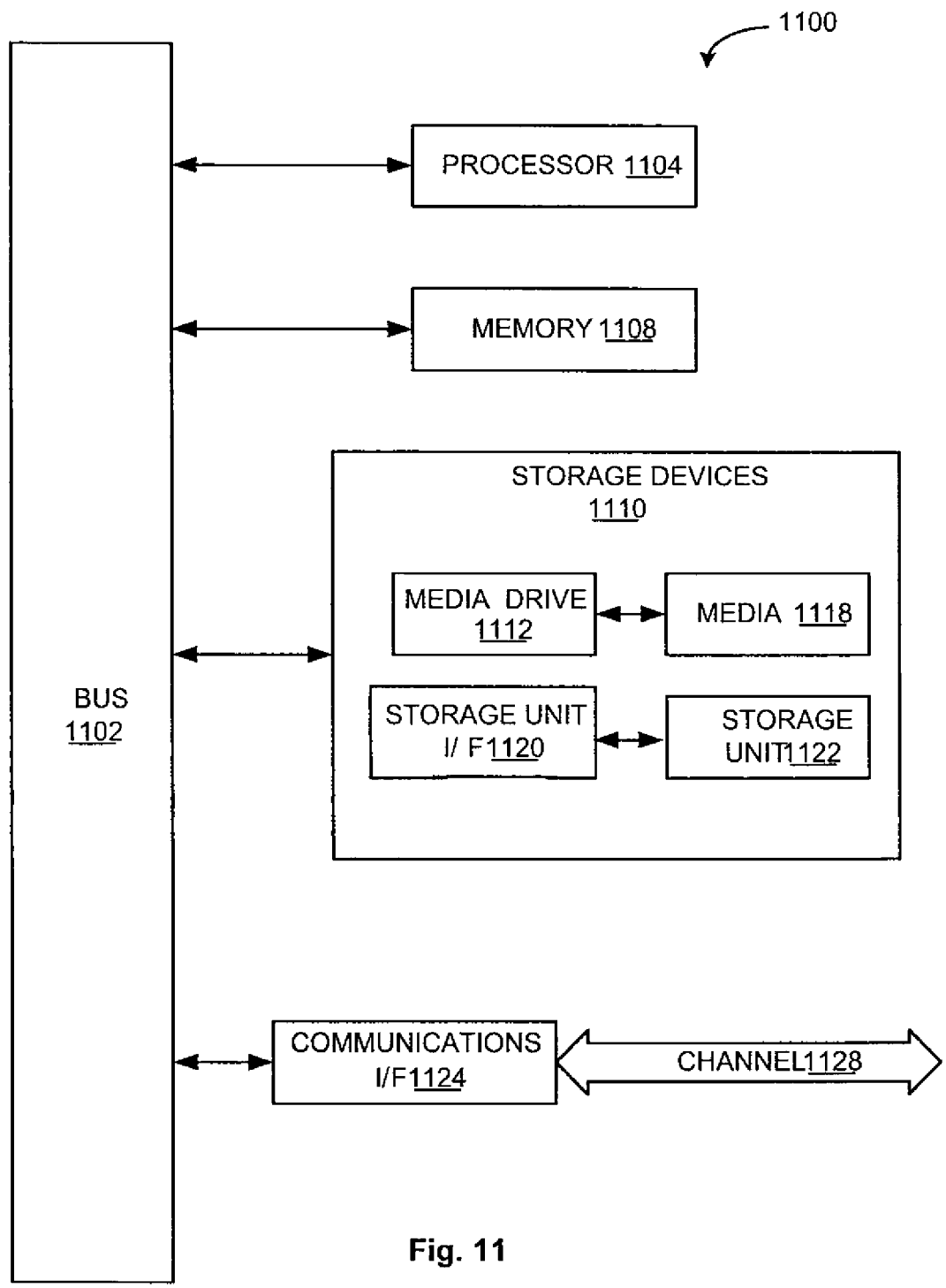
FIG. 11 is a block diagram of a computing system according to embodiments of the invention.

FIG. 11 illustrates an exemplary computing system 1100 that may be employed to implement processing functionality for various aspects of the invention (e.g., processing unit, microprocessor, a display control unit, and so on). Those skilled in the relevant art will also recognize how to implement the invention using other computer systems or architectures. Computing system 1100 may represent, for example, a desktop, processing unit, microprocessor, display control unit, or any other type of special or general purpose computing device as may be desirable or appropriate for a given application or environment. Computing system 1100 can include one or more processors, such as a processor 1104. Processor 1104 can be implemented using a general or special purpose processing engine such as, for example, a microprocessor, microcontroller or other control logic. In this example, processor 1104 is connected to a bus 1102 or other communication medium.

Computing system 1100 can also include a main memory 1108, for example random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory ("ROM") or other static storage device coupled to bus 1102 for storing static information and instructions for processor 1104.

The computing system 1100 may also include information storage mechanism 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1118 may include, for example, a hard disk, floppy disk, magnetic tape, optical disk, CD or DVD, or other fixed or removable medium that is read by and written to by media drive 1114. As these examples illustrate, the storage media 1118 may include a computer-readable storage medium having stored therein particular computer software or data.

In alternative embodiments, information storage mechanism 1110 may include other similar instrumentalities for allowing computer programs or other instructions or data to be loaded into computing system 1100. Such instrumentalities may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a USB port), a PCMCIA slot and card, etc. Software and data transferred via communications interface 1124 are in the form of signals which can be electronic, electromagnetic, optical, or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 1108, storage device 1118, storage unit 1122, or signal(s) on channel 1128. These and other forms of computer-readable media may be involved in providing one or more sequences of one or more instructions to processor 1104 for execution. Such instructions, generally referred to as "computer program code" (which may be grouped in the form of computer programs or other groupings), when executed, enable the computing system 1100 to perform features or functions of embodiments of the present invention.

In an embodiment where the elements are implemented using software, the software may be stored in a computer-readable medium and loaded into computing system 1100 using, for example, removable storage drive 1114, drive 1112 or communications interface 1124. The control logic (in this example, software instructions or computer program code), when executed by the processor 1104, causes the processor 1104 to perform the functions of the invention as described herein.

Figure 2:
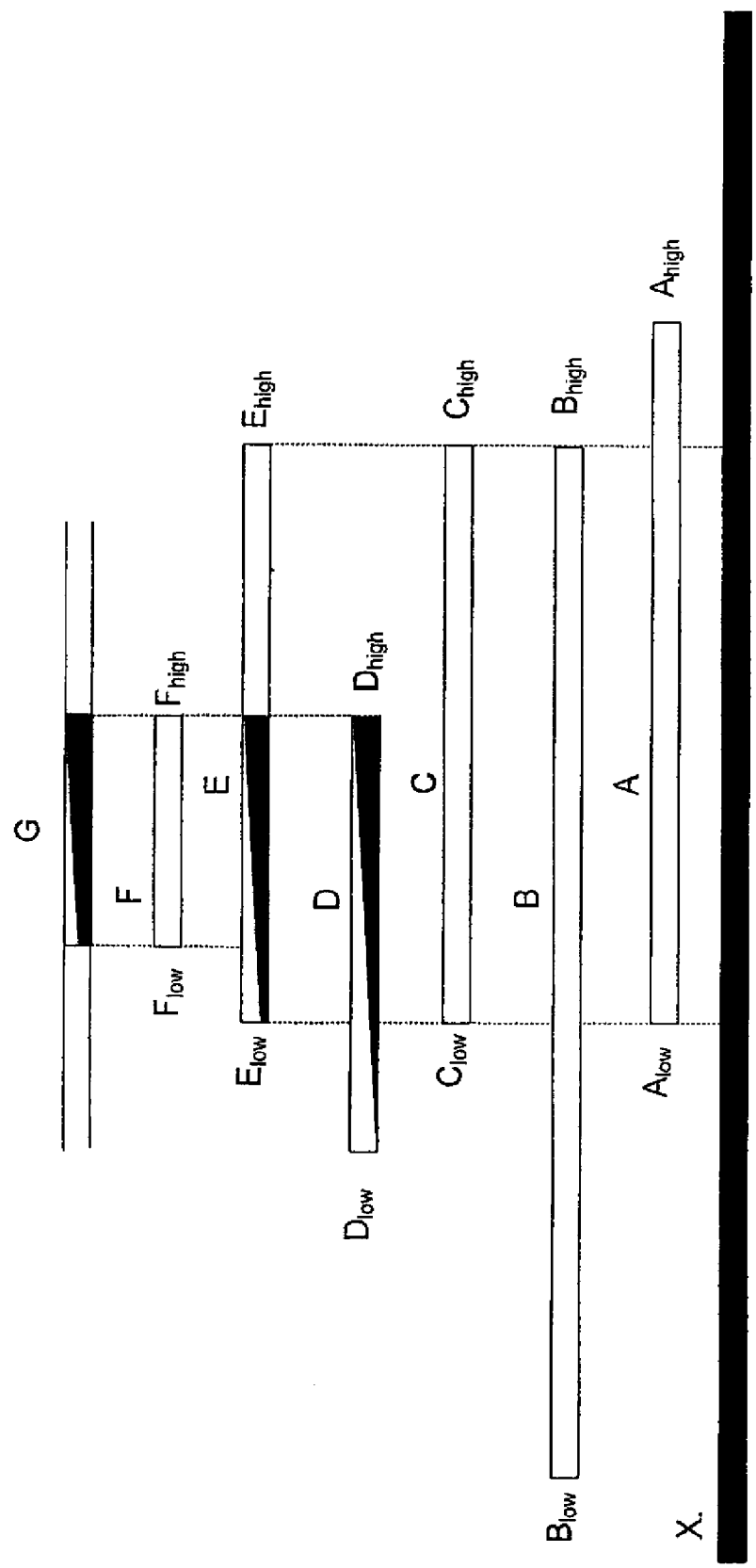
FIG. 2 is an illustration of parameters that may be used for displaying IR images in a IR camera according to embodiments of the invention.

FIG. 2 shows a number of parameters that determine the IR images or are used for presenting IR images in an IR camera display. FIG. 2 also illustrates the problem associated with presenting IR images in an IR camera display to a user of the IR camera. In FIG. 2, the "bars" represent different temperature ranges which are inherent in nature or in the IR camera, or levels/spans of different view parameter settings which may be possible to set by the user of the IR camera.

In FIG. 2, the following is shown and the notation is adhered to hereinafter:

X illustrates a theoretical scene content of the imaged view. This may substantially be any temperature range.

A illustrates the current scene content of the imaged view. $A_{low}$ denotes the lowest temperature and $A_{high}$ denotes the highest temperature of the current scene content.

B illustrates the entire current temperature range of the IR camera. $B_{low}$ denotes the lowest temperature, and $B_{high}$ denotes the highest temperature of the temperature range of the IR camera. It should be noted that a user may experience orientation problems when $B_{low}$ does not reach ambient temperature, and that for post-analysis for example it is very important for a user to have knowledge of the current temperature range of the IR camera since it may have "cut" the thermal image (i.e. see $B_{high}$ lower than $A_{high}$).

C illustrates the actual thermal image content captured by the IR camera. $C_{low}$ denotes the lowest temperature, and $C_{high}$ denotes the highest temperature in the captured thermal image content of the IR camera. The actual thermal image content C is limited by the temperature range B of the IR camera. The actual thermal image content C captured by the IR camera will inherently change in dependence of the view that is imaged by the user of the IR camera. For narrow temperature ranges, the actual thermal image content C captured by the IR camera will constitute a problem of orientation, and of visualisation of what is seen by the user of the IR camera.

D illustrates the choice of which temperature span to colourize. This is referred to herein as the thermal image colour scale. $D_{low}$ denotes the lowest temperature, and $D_{high}$ denotes the highest temperature which is to be colorized by the IR camera. D may also be referred to a thermal image colour span, and $D_{low}$ and $D_{high}$ may be referred to as thermal image colour levels or thermal image colour minimum and maximum. D is usually limited to a minimum span between $D_{low}$ and $D_{high}$.

E illustrates the IR camera's calculated colours to use in the thermal image. $E_{low}$ denotes the lowest temperature, and $E_{high}$ denotes the highest temperature which are coloured by the IR camera. However, in FIG. 2, since $D_{high}$ has been set lower than $C_{high}$, the part of E located between $D_{high}$ and $C_{high}$ are saturated, and therefore is coloured the same colour as the end of the temperature span D, or a particular colour used to display saturated parts of an thermal image.

F illustrates the thermal image fusion span. $F_{low}$ denotes the lower thermal image fusion level/threshold, and $F_{high}$ denotes the higher thermal image fusion level/threshold. For the actual image content C located in between the thermal image fusion levels, the IR camera will display IR data, and for the actual image content C located outside the thermal image fusion levels the IR camera will display a visual light data. It should be noted that if the thermal image fusion levels or span are set inside the thermal image colour scale (see e.g. $F_{low} > D_{low}$), some colours are not used.

G illustrates the resulting fusion image presented by the IR camera.

These parameters as described above are intuitively often mistaken by the user of the IR camera to mean something else than what they actually represent. One reason for this is that their complex relationships which in the end underlie the actual displayed thermal image. In prior art IR cameras, most of these parameters and/or their mutual relationships are hidden from the user. This leaves several possible and arbitrary interpretations to be made by the user of the IR camera from the displayed thermal images. Thus, there is a need for providing a user of an IR camera with an improved parameter interpretation and image control of the thermal images.

According to inventive features of embodiments of the invention, this problem is solved by having a display control unit in an IR camera configured to, besides displaying the thermal image, determine and display an indicator scale of the current temperature range B of the IR camera. In this indicator scale, equally sized temperature intervals are configured to have different geometric size in the indication scale based on upon the actual image content C of the captured thermal image. In the following it will become apparent that by in this way giving the user of the IR camera a dynamic reference scale to which the user may relate the presented thermal image, an improved parameter interpretation and image control of the thermal images is achieved.

Figure 3:
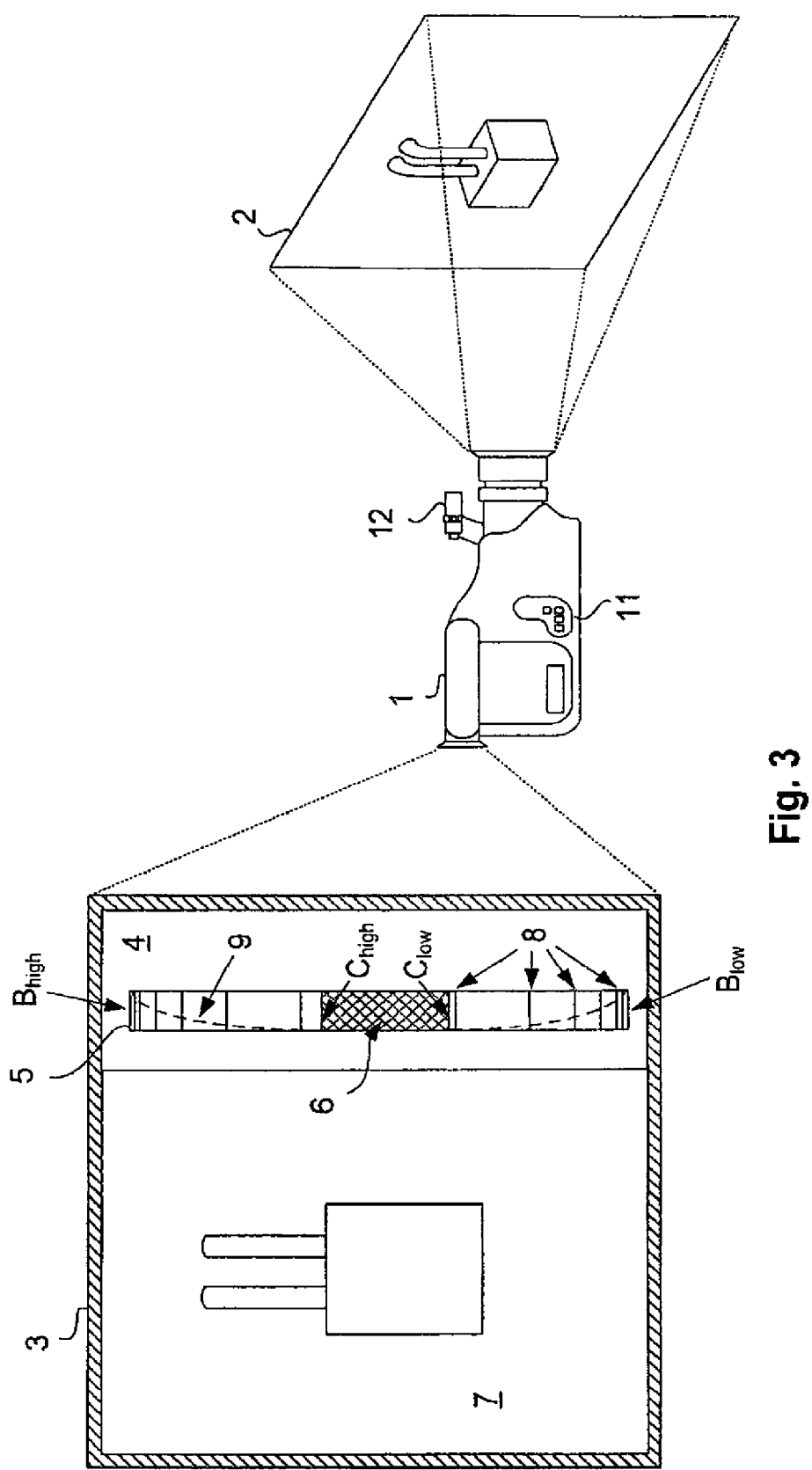
FIG. 3 is an illustration of an operation of an IR camera according to an exemplary embodiment of the invention.

FIG. 3 shows an operation of an IR camera 1 according to an exemplary embodiment of the invention. The IR camera 1 may be directed towards an imaged view 2. The imaged view 2 may comprise objects of which the user of the IR camera 1 wants to capture a thermal image 7. The IR camera 1 may capture the thermal image 7 and present said thermal image 7 in the IR camera display 3.

Various inputting means 11 for the IR camera 1 may be implemented, such as, for example, the IR camera display 3 in the IR camera 1 may comprise a touch screen which enables the user to input control signals through the IR camera display 3 directly, and/or the IR camera 1 may comprise a joystick, a scroll wheel, a key pad and/or buttons for inputting control signals to the IR camera 1. These inputting means 11 may, for example, be used to set different thermal image view parameters, and thus control the view of the thermal image in the IR camera display 3. As will further become apparent by following, an advantage of embodiments of the invention is that it provides a direct and intuitive use of such inputting means for image control in an IR camera.

As mentioned above, the display control unit 24 in the IR camera 1 is configured to receive thermal image signals. From the received thermal signals, the display control unit 24 is configured to calculate and determine an indicator scale 5. The indicator scale 5 may, for example, be configured to be displayed by the display control unit 24 to a user in an area 4 next to the thermal image 7 in the IR camera display 3. Alternatively, the indicator scale 5 may be presented to the right/left, top/bottom or any other suitable way in relation to the thermal image 4 in the IR camera display 3.

The indicator scale 5 is determined by the display control unit 24 as an indicator scale ranging over the entire current temperature range B, $B_{low}$ to $B_{high}$, of the IR camera 1. The current temperature range B, $B_{low}$ to $B_{high}$, of the IR camera 1 may vary in dependence of the components and capabilities of, for example, the at least one lens arrangement 21, the detector 22 and the signal conditioning and processing unit 23 or further components in the IR camera 1. In this indicator scale 5, equally sized temperature intervals have different geometric size in the indication scale 5 based on upon the actual image content C, $C_{low}$ to $C_{high}$, of the captured thermal image. This is described more in detail with reference to FIG. 4.

In the exemplary embodiment shown in FIG. 3, the actual image content C, $C_{low}$ to $C_{high}$, has been calculated to fit into the indicator scale 5 and is displayed as a temperature range bar 6 in the indicator scale 5. In the parts of the indicator scale 5 that are outside the temperature bar 6, equally sized temperature intervals are marked within limit indicators 8. As can be seen, the equally sized temperature intervals have different geometric sizes in the indication scale 5. This is because of the dependence upon the actual image content C, $C_{low}$ to $C_{high}$ (see FIG. 4). The limit indicators 8 are calculated and continuously updated along with the indication scale 5 in view of the actual image content C, $C_{low}$ to $C_{high}$. It is thus easy for a user of the IR camera 1 to directly and intuitively get an understanding of the temperature distribution of the indicator scale 5 in the parts of the indicator scale 5 that are outside the temperature bar 6. However, it should be understood that the limit indicators 8 are not essential to embodiments of the invention, but may further help the user of the IR camera 1 with the parameter orientation. It is also to be understood that the limit indicators 8 may alternatively also be extended into the temperature range bar 6 if, for example, it is deemed appropriate and suitable for demonstrating the temperature distribution of the indicator scale 5 therein. Alternatively, the temperature distribution of the indicator scale 5 may also be demonstrated in other ways, for example, by having curves or lines 9 displayed in the indicator scale 5 which may calculated to relate to the actual temperature distribution of the indicator scale 5. It should also be understood that various other ways of demonstrating the temperature distribution is anticipated by embodiments of the invention. These may typically be specifically configured in dependence of a particular application or implementation.

Figure 4:
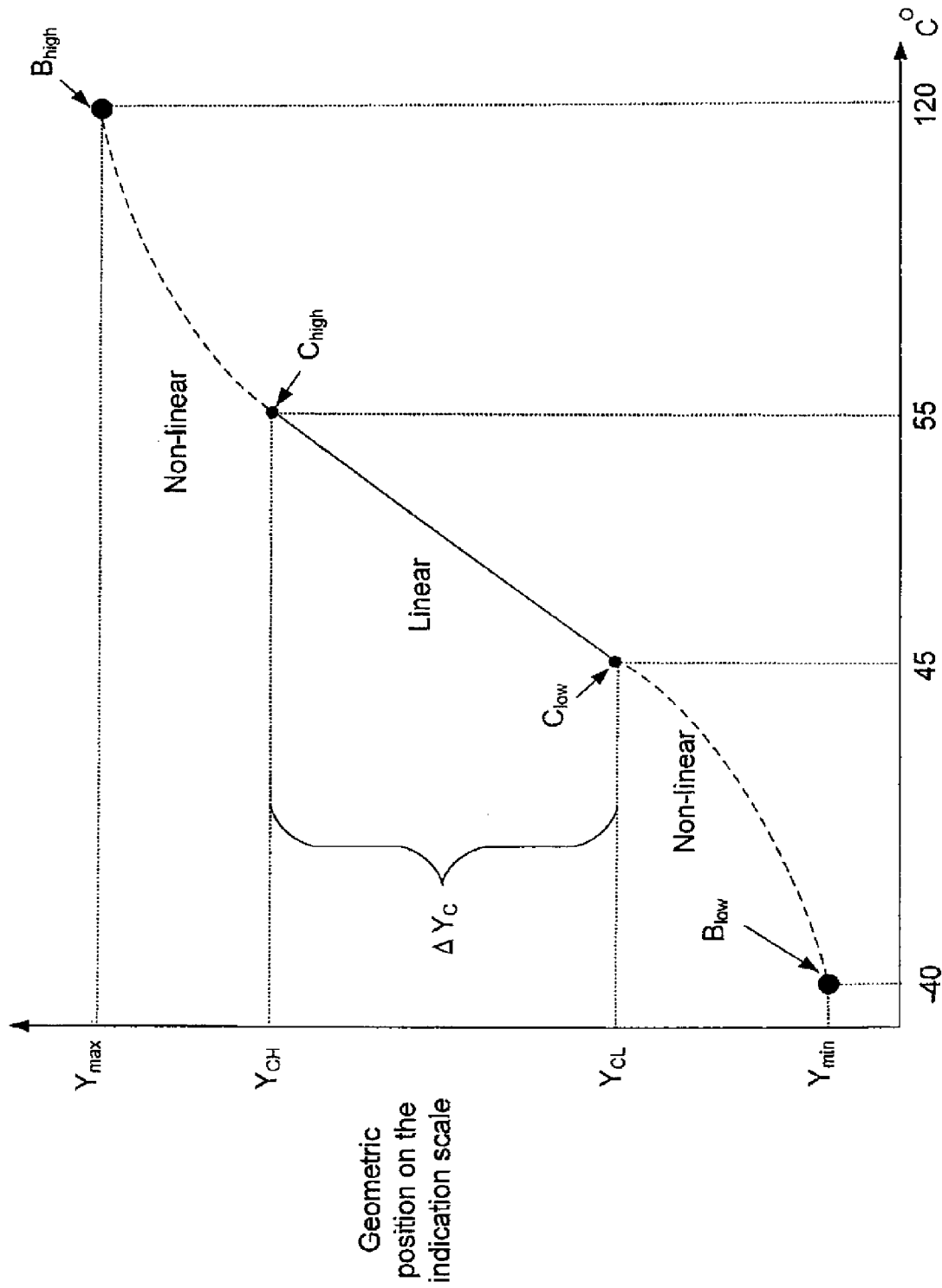
FIG. 4 is a scale-temperature diagram illustrating an operation of an IR camera according to an exemplary embodiment of the invention.

FIG. 4 shows a scale-temperature diagram illustrating an operation of an IR camera according to an exemplary embodiment of the invention. The scale-temperature diagram in FIG. 4 describes the relationship between the indication scale 5 and its dependency upon the actual image content C, $C_{low}$ to $C_{high}$, and thus also how the indication scale 5 is calculated and determined by the display control unit 24 in the IR camera 1.

The indication scale 5 may have a predetermined geometric width in the IR camera display 3. The geometric end points of the indication scale 5 are referred to herein as $Y_{max}$ and $Y_{min}$. The predetermined geometric width, $Y_{max}-Y_{min}$, of the indication scale 5 may typically be measured in pixels or any other suitable display unit or measurement. The geometric position on the indication scale 5 is shown on the vertical axis of the scale-temperature diagram, and its corresponding temperature value is shown on the horizontal axis of the scale temperature diagram. The geometric end point $Y_{max}$ corresponds to the maximum of the current temperature range, $B_{high}$, of the IR camera 1, and the geometric end point $Y_{min}$ corresponds to the minimum of the current temperature range, $H_{low}$, of the IR camera 1. In the example shown in FIG. 4, the current temperature range B of the IR camera 1 ranges from $B_{low}=-40°$ C. to $B_{high}=120°$ C.

In the example shown in FIG. 4, for a still thermal image, the actual image content C, $C_{low}$ to $C_{high}$, will have a fixed width within the indication scale 5. The indication scale 5 will range from the minimum of the current temperature range, $B_{low}$, of the IR camera 1 to the maximum of the current temperature range, $B_{low}$, of the IR camera 1, but with a non-linear temperature distribution between $C_{high}$ and $B_{high}$ (upper dashed line in FIG. 4), a linear temperature distribution between $C_{low}$ and $C_{high}$, (fully drawn line in FIG. 4), and a non-linear temperature distribution between $B_{low}$ and $C_{low}$ (lower dashed line in FIG. 4).

The non-linear area between $C_{high}$ and $B_{high}$ may be determined and configured such that the indication scale 5 has a progressive temperature distribution from $C_{high}$ to $B_{high}$ wherein equally sized temperature intervals have consecutively smaller geometric size in the indication scale 5 the closer the temperature interval is to the geometric end point, $Y_{max}$ which corresponds to $B_{high}$, in the indication scale 5. This means that the closer a move is towards $B_{high}$, the slower it gets, or the larger steps it takes in absolute values. This depends if the temperature values control the geometric size steps, or if the geometrical position controls the geometric size steps. The latter may, for example, be used for non-radiometric IR cameras. Similarly, the non-linear area between $B_{low}$ and $C_{low}$ may be determined and configured such that the indication scale 5 has a progressive temperature distribution from $C_{low}$ to $B_{low}$ wherein equally sized temperature intervals have consecutively smaller geometric size in the indication scale 5 the closer the temperature interval is to the geometric end point, $Y_{min}$ which corresponds to $B_{low}$, in the indication scale 5.

This may be implemented mathematically in many different ways and in view of a specific application. One way to achieve the non-linear temperature distribution referred to in the above is to use second grade approximations (e.g. as shown by the example below). However, it should also be noted that the temperature distribution in the areas outside the actual image content C, $C_{low}$, to $C_{high}$, in the indication scale 5 does not necessarily have to be non-linear, as long as the temperature distribution of the actual image content C, $C_{low}$ to $C_{high}$, and in the areas outside the actual image content C, $C_{low}$ to $C_{high}$, in the indication scale 5 relates to each other in a similar fashion as described above. The relation between the temperature distribution of the actual image content C, $C_{low}$ to $C_{high}$, in the indication scale 5 and the temperature distribution outside of the actual image content C, $C_{low}$ to $C_{high}$, in the indication scale 5, may preferably be configured such that the actual image content C, $C_{low}$ to $C_{high}$, takes up about 30 to 50% of the predetermined geometric width of the indication scale 5 in the IR camera display 3.

One example of how to mathematically implement and construct a functional relation Y=F(x) that satisfy the conditions described above, and with reference to FIG. 4, is described below. The following definitions will be used in this example:

$\Delta Y = Y_{max} - Y_{min}$, is the total geometrical size of the indication scale;

$Y_{CH}$ is the geometrical position in the indication scale of $C_{high}$;

$Y_{CL}$ is the geometrical position in the indication scale of $C_{low}$;

$\Delta Y_C = Y_{CH} - Y_{CL}$, is the geometrical size in the indication scale of the temperature difference $C_{high} - C_{low}$;

$\Delta B = B_{high} - B_{low}$, is the temperature difference $B_{high} - B_{low}$; and $\Delta C = C_{high} - C_{low}$, is the temperature difference $C_{high} - C_{low}$.

First, a size of $\Delta Y_C$ may be defined according to Eq. 1. The minimum relative size of $\Delta Y_C$ may be set to $\alpha$, wherein $0 < \alpha < 1$.

$$\Delta Y_C = \Delta Y \cdot \left( \alpha + (1-\alpha) \cdot \sqrt{\frac{\Delta C}{\Delta B}} \right) \quad \text{(Eq. 1)}$$

Secondly, an approximation of F(x) may be achieved. Three lines L1, L2 and L3 may be defined with the following geometrical constraints:

L1 goes through the point $(B_{low}, Y_{min})$;
L1 intersect L2 at the point: $(C_{low}, Y_{CL})$;
L2 intersect L3 at the point: $(C_{high}, Y_{CH})$;
L3 goes through the point: $(B_{high}, Y_{max})$; and
L1 is parallel to L3.

These geometrical constraints together with $\Delta Y_C$ may define straight line equations of L1, L2 and L3. L2 may then define F(x) inside the interval of $[C_{low}, C_{high}]$. L1 and L3 however, may not be suitable to be used to define F(x) because that would give F(x) "sharp corners" in points $(C_{low}, Y_{CL})$ and $(C_{high}, Y_{CH})$. Thus, a non-linear representation outside of the interval of $[C_{low}, C_{high}]$ may be desired.

Therefore, a function $G_3(x)$ may represent the progressive/non-linear part of F(x) in the interval $[C_{high}, B_{high}]$, wherein $G_3(x)$ comprises the following geometrical constraints:

I. The curve should go through points $(C_{high}, Y_{CH})$ and $(B_{high}, Y_{max})$;

II. The tangent of $G_3(x)$ at point $(B_{high}, Y_{max})$ is the line L2; and

III. $G_3(x)$ should be concave and growing.

The inverse of $G_3(x)$ is then defined as $H_3(y)$, wherein $H_3(y)$ may be defined as $H_3(y)=a+b\cdot y+c\cdot y^2$ (a second grade approximation) and the geometrical constraints (I) and (II) may be used to derive the constant values of a, b, and c. Alternatively, $G_3(x)$ or $H_3(y)$ may be approximated using a logarithmic or exponential functions. With condition (III) it is then possible to invert $H_3(y)$ according to Eq. 2.

$$G_3(x) = H_3(x)^{-1} = -\frac{b}{2c} \pm \sqrt{\left(\frac{b^2}{4c^2} - \frac{(a-x)}{c}\right)} \qquad \text{(Eq. 2)}$$

In a similar manner, a function $G_1(x)$ may be defined as a representation of F(x) in the interval $[C_{low}, B_{low}]$.

Thus, F(x) may be defined by function $G_1(x)$ in the interval $[C_{low}, B_{low}]$, by $L_2(x)$ in the interval $[C_{low}, C_{high}]$, and by $G_3(x)$ in the interval $[C_{high}, B_{high}]$, wherein F(x) is differentiable and has an inverse. As noted above, one important aspect of any chosen mathematical implementation is that the transitions from the linear temperature distribution to the non-linear temperature distribution, and vice versa, are performed smoothly.

Thus, by having the actual image content C, $C_{low}$ to $C_{high}$, arranged according to a linear temperature distribution in the indication scale 5, while having other parts of the indication scale 5 arranged according to a non-linear temperature distribution, the user of the IR camera 1 may automatically be "zoomed in" on the actual image content C, $C_{low}$ to $C_{high}$, within and relative to the entire current temperature range B, $B_{low}$ to $B_{high}$, in the indication scale 5. That is, the part of the geometric width of the indication scale 5 in the IR camera display 3 afforded to the actual image content C (i.e. $\Delta Y_c$) will, relative to their temperature content, be larger than the part of the geometric width of the indication scale 5 in the IR camera display afforded to the rest of the current temperature range B, $B_{low}$ to $B_{high}$.

Figure 5C:
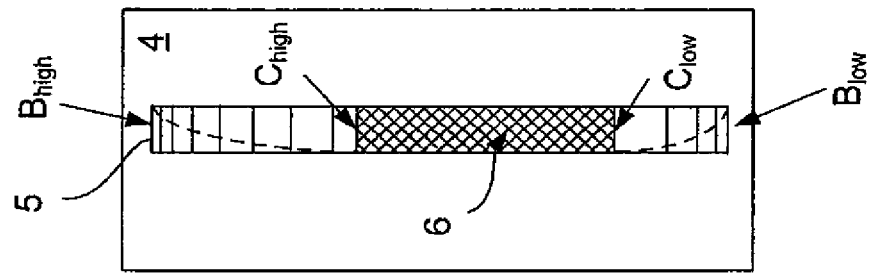
FIGS. 5A-5C are further illustrations of an operation of an IR camera according to an exemplary embodiment of the invention.
Figure 5B:
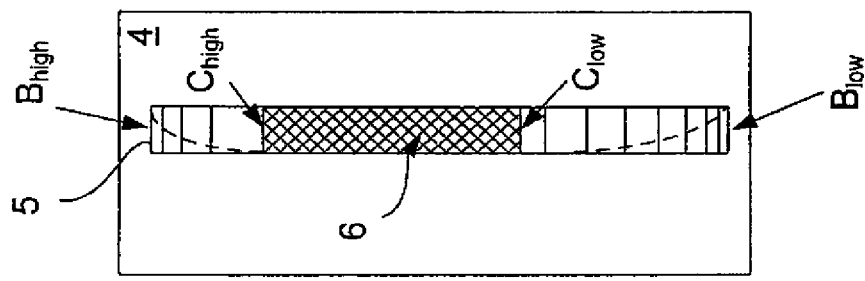
Figure 5A:
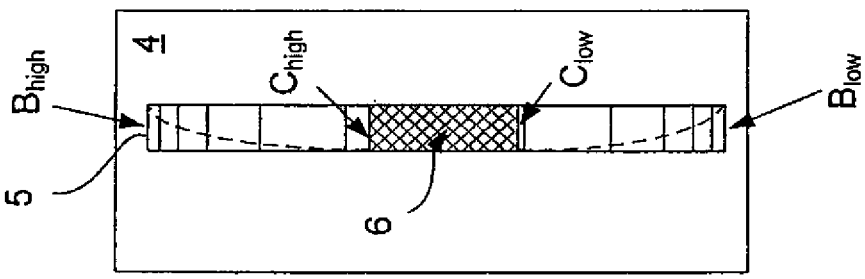

For continuous thermal imaging, this means that since the actual image content C, $C_{low}$ to $C_{high}$, will have a range that varies in according to what is captured by the IR camera 1, a small actual image content C, $C_{low}$ to $C_{high}$, will be displayed as a relatively large portion of the indication scale 5, while a large actual image content C, $C_{low}$ to $C_{high}$, will be limited so as to not be displayed too large in relation to the entire current temperature range B, $B_{low}$ to $B_{high}$, in the indication scale 5. Thus, when a user of the IR camera 1 moves the IR camera 1 to image another scene, the actual image content C, $C_{low}$ to $C_{high}$, will change, and if the actual image content C, $C_{low}$ to $C_{high}$, is shown as a temperature range bar 6, as shown in FIG. 3 and FIGS. 5A-5C, the temperature range bar 6 will move up/down and change size within the indication scale 5. This behaviour of the temperature range bar 6 in the indication scale 5 is illustrated in FIGS. 5A-5C.

FIG. 5A shows a temperature range bar 6 in the indication scale 5 wherein the actual image content C, $C_{low}$ to $C_{high}$, is very small in comparison to the current temperature range B, $B_{low}$ to $B_{high}$. For example, the actual image content C, $C_{low}$ to $C_{high}$, may be in the range of a few degrees, such as, 45° C.-48° C., while the current temperature range B, $B_{low}$ to $B_{high}$, may comprise a relatively large span, such as, -40° C.-120° C.

FIG. 5B shows a temperature range bar 6 in the indication scale 5 wherein the actual image content C, $C_{low}$ to $C_{high}$, has largely increased (namely, an increase of $C_{high}$) in comparison to the actual image content C, $C_{low}$ to $C_{high}$, in FIG. 4. For example, the actual image content C, $C_{low}$ to $C_{high}$, may now be in the range 45° C.-85° C., while the current temperature range B, $B_{low}$ to $B_{high}$, still comprises the same temperature span, -40° C.-120° C. The temperature bar of the actual image content C, $C_{low}$ to $C_{high}$, in the indication scale 5 will thus be larger since a larger part of the indication scale 5 now comprises a linear temperature distribution.

FIG. 5C shows a temperature range bar 6 in the indication scale 5 wherein the actual image content C, $C_{low}$ to $C_{high}$, also has largely increased (namely, a decrease of $C_{low}$) in comparison to the actual image content C, $C_{low}$ to $C_{high}$, in FIG. 4. For example, the actual image content C, $C_{low}$ to $C_{high}$, may now be in the range -5° C.-48° C., while the current temperature range B, $B_{low}$ to $B_{high}$, still comprises the same temperature span, -40° C.-120° C. Similar to FIG. 5B, the temperature bar of the actual image content C, $C_{low}$ to $C_{high}$, in the indication scale 5 will also be larger, since a larger part of the indication scale 5 now comprises a linear temperature distribution.

It should be noted that if the actual image content C, $C_{low}$ to $C_{high}$, is outside of the current temperature range B, $B_{low}$ to $B_{high}$, of the IR camera 1, the actual image content C, $C_{low}$ to $C_{high}$ will simply not be displayed in the IR camera display 3. However, when a user of the IR camera 1 views the indication scale 5 in the IR camera display 3 while imaging a scene, and sees the actual image content C, $C_{low}$ to $C_{high}$, getting close to any of the two limits of the current temperature range B, $B_{low}$ to $B_{high}$, the user of the IR camera is given a very clear and intuitive indication that it may be time to adjust or change the current temperature range B, $B_{low}$ to $B_{high}$, of the IR camera 1.

For an IR camera 1 wherein the current temperature range B, $B_{low}$ to $B_{high}$, is capable of being adjusted, the display control unit 24 according to embodiments of the invention may comprise functionality that allows several different ways of adjusting the current temperature range B, $B_{low}$ to $B_{high}$, in the indication scale 5. First, the display control unit 24 may comprise a fully automatic mode, wherein said display control unit 24 is configured to fully automatically adjust the current temperature range B, $B_{low}$ to $B_{high}$, in the indication scale 5 in dependence of the variations of the actual image content C, $C_{low}$ to $C_{high}$. This may, for example, be performed if the actual image content C, $C_{low}$ to $C_{high}$, is close to any of the end points, $B_{low}$ and $B_{high}$, of the current temperature range B, wherein the IR camera 1 may be configured to automatically switch to another temperature range B, $B_{low}$ to $B_{high}$, in order to better match the actual image content C, $C_{low}$ to $C_{high}$.

Secondly, the display control unit 24 may comprise a semi-automatic mode, wherein said display control unit 24 is arranged to allow a user of the IR camera 1 to one-shot adjustments of the current temperature range B, $B_{low}$ to $B_{high}$, in the indication scale 5 based on either the thermal image colour scale D, $D_{low}$ to $D_{high}$, or based on the actual image content C, $C_{low}$ to $C_{high}$. The semi-automatic mode is similar to the fully automatic mode, although the updates are performed on a user initiated basis instead of being continuously updated. Thirdly, the display control unit 24 may comprise a manual mode, wherein said display control unit 24 is configured to allow a user of the IR camera 1 to use the inputting means 11 of the IR camera 1 to adjust the current temperature range B, that is, the levels $B_{low}$ and $B_{high}$, in the indication scale 5 up or down.

Furthermore, it is clear from the above that the visualization afforded by indication scale 5 of embodiments, immediately and intuitively may relate important parameters to the user of the IR camera 1, and thus answer questions such as, for example, which temperatures does the IR camera 1 detect (i.e. the current temperature range B, $B_{low}$ to $B_{high}$), and which temperatures does the scene that the user is currently imaging actually contain? (i.e. the actual image content C, $C_{low}$ to $C_{high}$).

Figure 6:
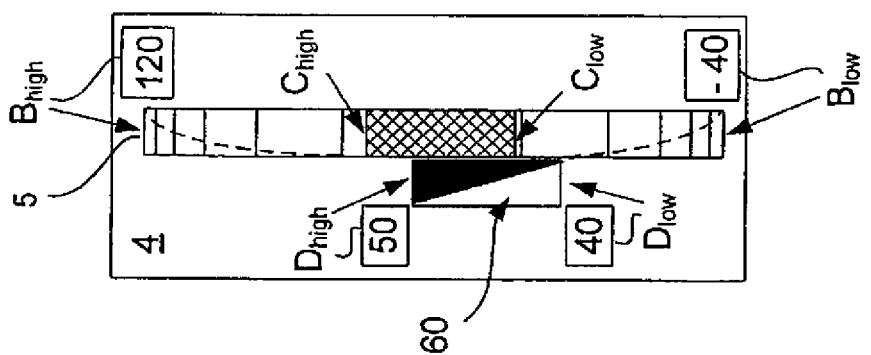
FIG. 6 is another further illustration of an operation of an IR camera according to an exemplary embodiment of the invention.

FIG. 6 is another further illustration of an operation of an IR camera according to an exemplary embodiment of the invention. As shown in FIGS. 6-9, the indication scale 5 may optionally further comprise numerical indicators for the end points $B_{low}$ and $B_{high}$ of the current temperature range B of the IR camera 1. In the IR camera 1, thermal image colour levels and span D, $D_{low}$ to $D_{high}$, which determines which temperature span is to be colourized by the IR camera 1, are adjustable view parameter settings which may be set by the user of the IR camera 1 or be automatically connected to the actual image content C, $C_{low}$ to $C_{high}$.

In FIG. 6, the thermal image colour levels and span D, $D_{low}$ to $D_{high}$, has been associated with the indication scale 5. This means the display control unit 24 has to adapt and determine the thermal image colour levels and span D, $D_{low}$ to $D_{high}$, such that they relate to the scaling of the determined indication scale 5. The thermal image colour levels and span D, $p_{low}$ to $D_{high}$, may then be displayed in relation to the indication scale 5 in the IR camera display 3. The thermal image colour levels and span D, $D_{low}$ to $D_{high}$, may, for example, be displayed as a temperature range bar 60. The indication scale 5 may optionally further comprise numerical indicators for the end points $D_{low}$ and $D_{high}$ of the thermal image colour span D of the IR camera 1. However, the latter may not be available for use in non-radiometric IR cameras.

Because the actual image content C, $C_{low}$ to $C_{high}$, when associated with and displayed in relation to the indication scale 5, always will be displayed in the indication scale 5 relatively large, it is possible for a user of the IR camera 1 to directly visually connect the thermal image colour levels and span D, $D_{low}$ to $D_{high}$, to both the entire current temperature range B, $B_{low}$ to $B_{high}$, and the actual image content C, $C_{low}$ to $C_{high}$, by viewing the geometric position of the thermal image colour levels and span D, $D_{low}$ to $D_{high}$, in the indication scale 5.

Figure 7:
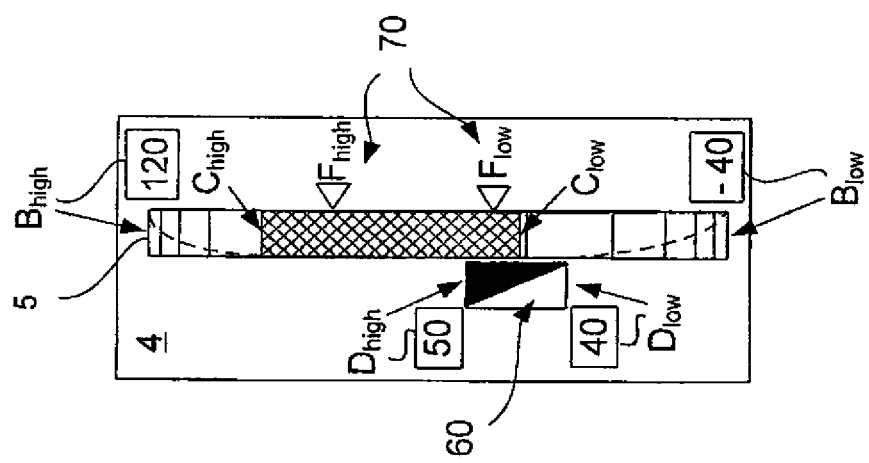
FIG. 7 is another further illustration of an operation of an IR camera according to an exemplary embodiment of the invention.

Consequentially, the thermal image colour levels and span D, $D_{low}$ to $D_{high}$, will follow the scaling of the indication scale 5. It follows that the geometric size of thermal image colour span D in the indication scale 5 will be continuously altered in dependence of changes in the actual image content C, $C_{low}$ to $C_{high}$, even though the thermal image colour levels and span D, $D_{low}$ to $D_{high}$, are the same. This is illustrated in FIG. 7, wherein the actual image content C, $C_{low}$ to $C_{high}$, has changed. Alternatively, the thermal image colour levels and span D, $D_{low}$ to $D_{high}$, may be automatically set by the display control unit 24. The display control unit 24 may, for example, link the thermal image colour levels and span D, $D_{low}$ to $D_{high}$, to the current limits and span of the actual image content C, $C_{low}$ to $C_{high}$.

Furthermore, this embodiment will give an intuitive feedback to a user of the IR camera 1 when controlling the thermal image colour levels and span D, $D_{low}$ to $D_{high}$, using the inputting means 11 of the IR camera 1, such as, a touch screen, a joystick, etc. This is because the resetting of thermal image colour levels and span D, $D_{low}$ to $D_{high}$, may be performed visually in relation to the entire current temperature range B, $B_{low}$ to $B_{high}$, and the actual image content C, $C_{low}$ to $C_{high}$. In particular, the thermal image colour levels and span D, $D_{low}$ to $D_{high}$, are in this inventive manner, adjustable to let the user of the IR camera 1 relate a certain image colour to an approximate temperature by visually and geometrically linking it to the actual image content C, $C_{low}$ to $C_{high}$. Thus, a user of the IR camera 1 may control thermal image colour levels and span D, $D_{low}$ to $D_{high}$, without only having to relate to the numerical values of the thermal image colour levels, $D_{low}$ and $D_{high}$, as in the prior art.

The relation between the thermal image colour levels and span D, $D_{low}$ to $D_{high}$, and the actual image content C, $C_{low}$ to $C_{high}$, may, for example, be dynamically visualized with further indication means, such as, moving arrows or similar. The moving arrows may, for example, be display as the user of the IR camera 1 is resetting the thermal image colour levels and span D, $D_{low}$ to $D_{high}$.

FIG. 7 is another further illustration of an operation of an IR camera according to an exemplary embodiment of the invention. In the IR camera 1, thermal image fusion levels and span F, $F_{low}$ and $F_{high}$, for mixing thermal and visual light images, are adjustable view parameter settings which may be set by the user of the IR camera 1.

In FIG. 7, the fusion thresholds and span F, $F_{low}$ to $F_{high}$, have been associated with the indication scale 5. This means that the display control unit 24 has to adapt and determine the fusion thresholds and span F, $F_{low}$ to $F_{high}$, such that they relates to the scaling of the determined indication scale 5. The fusion thresholds and span F, $F_{low}$ to $F_{high}$, may then be displayed in relation to the indication scale 5 in the IR camera display 3. The fusion thresholds and span, $F_{low}$ and $F_{high}$, may for example be displayed using further indication means 70. The indication scale 5 may optionally further comprise numerical indicators (not shown) for the end points $F_{low}$ and $F_{high}$ of the fusion span D of the IR camera 1. Preferably, the fusion thresholds and span F, $F_{low}$ to $F_{high}$, may also be linked to the actual image content C, $C_{low}$ to $C_{high}$. The fusion thresholds and span F, $F_{low}$ to $F_{high}$, may then be visualised as limits on the actual image content C, $C_{low}$ to $C_{high}$, in the indication scale 5.

In some cases, the thermal image colour levels and span D, $D_{low}$ to $D_{high}$, may be locked to the fusion thresholds and/or spans, $F_{low}$ and $F_{high}$. This may be preferred since then there may only be one or two parameters that have to be controlled manually. In the prior art, however, such settings in an IR camera have been shown very difficult to be used by a user of the IR camera since the user of the IR camera has nothing to relate the fusion thresholds and span F, $F_{low}$ and $F_{high}$, to. According to embodiments of the invention, a context for the fusion thresholds and span F, $F_{low}$ and $F_{high}$, are provided, whereby such settings may be very advantageous and beneficial for the user of the IR camera 1.

Figure 8:
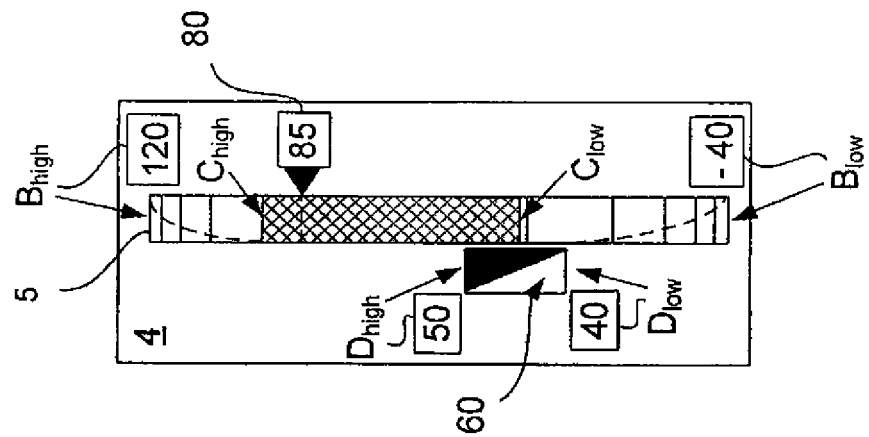
FIG. 8 is another further illustration of an operation of an IR camera according to an exemplary embodiment of the invention.

FIG. 8 is another further illustration of an operation of an IR camera according to an exemplary embodiment of the invention. In the IR camera 1, isotherm levels 80 are adjustable view parameter settings which may be set by the user of the IR camera 1.

In FIG. 8, at least one isotherm level 80 has been associated with the indication scale 5, and displayed in relation to the indication scale 5 in the IR camera display 3. The isotherm level 80 may, for example, be displayed using further indication means 70. The indication scale 5 may optionally further comprise a numerical indicator for the at least one isotherm level 80 in the IR camera 1. Isotherms may also exist for intervals/spans, or to indicate temperatures above/below a particular temperature. This means that the isotherms may have either one or two adjustable parameters settings.

The at least one isotherm level 80 may be configured to provide a semitransparent colouring of a part of the thermal image 7 on top of the thermal image 7. By enabling a user of an IR camera 1 to control the at least one isotherm level 80 in relation the entire current temperature range B, $B_{low}$ to $B_{high}$, and the actual image content C, $C_{low}$ to $C_{high}$, as well as alternatively the thermal image colour levels and span D, $D_{low}$ to $D_{high}$, this embodiment gives the user of the IR camera 1 a much better control and visualisation of the at least one isotherm level 80.

FIG. 9 is another further illustration of an operation of an IR camera according to an exemplary embodiment of the invention. In the IR camera 1, a thermal image histogram 90 may be calculated in order to indicate the actual temperature distribution within the actual image content C, $C_{low}$ and $C_{high}$, of the captured thermal image 7.

In FIG. 9, the thermal image histogram 90 has been associated with the indication scale 5. This means that the display control unit 24 has to adapt and determine the thermal image histogram 90 such that it relates to the scaling of the actual image content C, $C_{low}$ and $C_{high}$, of the captured thermal image 7 and the determined indication scale 5. The thermal image histogram 90 may then be displayed in relation to the indication scale 5 in the IR camera display 3. The thermal image histogram 90 may, for example, be displayed in relation to the temperature range bar 60 so as to directly correlate to the actual image content C, $C_{low}$ and $C_{high}$, of the captured thermal image 7 in the indication scale 5.

The indication scale 5 provided by the display control unit 24 according to the embodiments of the invention as described above, result in an improved image control when using the inputting means 11 of the IR camera 1. The inputting means 11 may, for example, provide an improved control over any one of the view parameter settings: thermal image colour levels or spans D, $D_{low}$ and $D_{high}$; isotherm levels or spans 80, and/or fusion thresholds or spans F, $F_{low}$ and $F_{high}$. This may be performed by the inputting means 11 having, for example, a joystick, a scroll wheel, a mouse, buttons and/or a touch screen interface. If the inputting means 11 comprises, for example, a joystick, the values of the view parameter settings would naturally and intuitively increase/decrease with the movement of the joystick by the user of the IR camera 1. This means that their visual representation in the indication scale 5 also would move up/down, when pressing the joystick up/down. If the inputting means 11 comprises a touch screen, any one of the view parameter settings displayed in the indication scale 5 may be configured to be "grabbed" and moved within the entire current temperature range B, $B_{low}$ to $B_{high}$. This is a great improvement over prior art IR cameras, in which touch screen handling mainly consists of ± operations instead of any directly grab and slide functions. Also, if a user of the IR camera 1 is stepping upwards/downwards using the inputting means 11 in the same amount pixels, or other display units, the steps in temperature are smaller close to the interesting area of the measurement.

Furthermore, the display control unit 24 may be configured to provide visual cues to a user of the IR camera 1 while using the inputting means 11. For example, such visual cues may be displayed as the user of the IR camera 1 adjusts the level or span of a view parameter setting. The visual cues may be arranged to indicate to the user of the IR camera 1 what is happening and give feedback to the user of the IR camera 1 that, for example, a button press has been accepted, etc.

FIG. 10 is a flowchart illustrating a method according to an exemplary embodiment of the invention. In step S101, the display control unit 24 determines an indication scale 5 comprising the entire current temperature range, $B_{low}$ to $B_{high}$, of the IR camera 1. The display control unit 24 is determined such that equally sized temperature intervals have different geometric size in the indication scale 5. This is determined based on upon the actual image content, $C_{low}$ to $C_{high}$, of the captured thermal image 7 by the IR camera 1.

In step S101, the display control unit 24 may alternatively also associate the actual image content, $C_{low}$ to $C_{high}$, of the captured thermal image 7 with the indication scale 5. This means adapting and determining the actual image content, $C_{low}$ to $C_{high}$, such that it relates to the scaling of the determined indication scale 5. In step S101, the display control unit 24 may further alternatively associate at least one view parameter setting $D_{low}$, $D_{high}$, $F_{low}$, $F_{high}$, with the indication scale 5, that is, adapt and determine the at least one view parameter setting $D_{low}$, $D_{high}$, $F_{low}$, $F_{high}$, such that it relates to the scaling of the determined indication scale 5.

Also, in step S101, the display control unit 24 may further alternatively associate a thermal image histogram 90 with the actual image content $C_{low}$, $C_{high}$ of the captured thermal image 7 and the determined indication scale 5. This means adapt and determine the thermal image histogram 90 with the actual image content $C_{low}$, $C_{high}$ of the captured thermal image 7 and the indication scale 5 such that it relates to the scaling of the actual image content $C_{low}$, $C_{high}$ of the captured thermal image 7 that is determined in view of the determined indication scale 5.

In step S102, the display control unit 24 control the IR camera display 3 to display the determined indication scale 5 to a user of said IR camera 1.

Also, if the actual image content, $C_{low}$ to $C_{high}$, of the captured thermal image 7 was associated with the indication scale 5 in step S101, the display control unit 24 may in step S102 control the IR camera display 3 to also display the actual image content, $C_{low}$ to $C_{high}$, of the captured thermal image 7 in relation to the indication scale 5. Furthermore, if at least one view parameter setting $D_{low}$, $D_{high}$, $F_{low}$, $F_{high}$, was associated with the indication scale 5 in step S101, the display control unit 24 may in step S102 control the IR camera display 3 to also display the at least one view parameter setting $D_{low}$, $D_{high}$, $F_{low}$, $F_{high}$, in relation to the indication scale 5.

Moreover, if a thermal image histogram 90 was associated with the actual image content $C_{low}$, $C_{high}$ of the captured thermal image 7 and the indication scale 5 in step S101, the display control unit 24 may in step S102 control the IR camera display 3 to also display the thermal image histogram 90 in relation to the actual image content $C_{low}$, $C_{high}$ of the captured thermal image 7 and the indication scale 5.

The description above is of the best mode presently contemplated for practising embodiments of the invention. The description is not intended to be taken in a limiting sense, but is made merely for the purpose of describing the general principles of embodiments of the invention.

We claim:

1. An IR camera for capturing thermal images of an imaged view, said IR camera comprising:
   an IR camera display configured to display said captured thermal images to a user of said IR camera;
   display control circuitry configured to control the IR camera display to further display a current temperature range, $B_{low}$ to $B_{high}$, of the IR camera, said display control circuitry being configured to:
- determine an indication scale comprising the current temperature range, $B_{low}$ to $B_{high}$, of the IR camera, wherein the indication scale is partitioned into areas within and outside an actual image content, $C_{low}$ to $C_{high}$, of the captured thermal image, and wherein equally sized temperature intervals have larger geometric sizes in the indication scale for the area within the actual image content than for the area outside the actual image content, $C_{low}$ to $C_{high}$, of the captured thermal image; and
- control the IR camera display to display said indication scale to the user of said IR camera.

2. The IR camera according to claim 1, wherein the indication scale is determined such that in the indication scale area outside the actual image content, $C_{low}$ to $C_{high}$, of the captured thermal image, the geometric sizes of the equally sized temperature intervals progressively decrease towards either end of the indication scale.

3. The IR camera according to claim 1, wherein the indication scale is determined such that the temperature intervals in the actual image content, $C_{low}$ to $C_{high}$, of the captured thermal image are linearly distributed.

4. The IR camera according to claim 1, wherein the indication scale is determined such that the temperature intervals of the indication scale which are outside the actual image content, $C_{low}$ to $C_{high}$, are non-linearly distributed.

5. The IR camera according to claim 4, wherein said temperature intervals of the indication scale which are non-linearly distributed are approximated using second grade equations.

6. The IR camera according to claim 1, wherein the indication scale is determined such that the equally sized temperature intervals have varying geometric sizes only in the indication scale area outside the actual image content, $C_{low}$ to $C_{high}$.

7. The IR camera according to claim 1, wherein said display control circuitry is further configured to:
- associate the actual image content, $C_{low}$ to $C_{high}$, of the captured thermal image with the indication scale; and
- control the IR camera display to display said actual image content, $C_{low}$ to $C_{high}$, of the captured thermal image in relation to the indication scale.

8. The IR camera according to claim 1, wherein said display control circuitry is further configured to:
- associate at least one view parameter setting ($D_{low}$, $D_{high}$; $F_{low}$, $F_{high}$), which determine how the captured thermal image is presented to the user of said IR camera, with said indication scale in the IR camera display; and
- control the IR camera display to display said at least one view parameter setting ($D_{low}$, $D_{high}$; $F_{low}$, $F_{high}$) in relation to said indication scale.

9. The IR camera according to claim 8, wherein said view parameter setting may be any one of the view parameter settings comprised in the group of:
- determined colour scale levels or spans ($D_{low}$, $D_{high}$);
- determined isotherm levels and/or spans; and
- fusion thresholds and/or spans ($F_{low}$, $F_{high}$) for mixing thermal and visual light images.

10. The IR camera according to claim 1, wherein said display control circuitry is further configured to:
- associate a thermal image histogram, which indicates the temperature distribution within the actual image content ($C_{low}$, $C_{high}$) of the captured thermal image, with the actual image content ($C_{low}$, $C_{high}$) of the captured thermal image and the indication scale; and
- control the IR camera display to display said thermal image histogram in relation to the actual image content ($C_{low}$, $C_{high}$) of the captured thermal image and the indication scale.

11. A method of displaying captured thermal images of an IR camera on a display,
said method comprising:
- determining an indication scale comprising a current temperature range, $B_{low}$ to $B_{high}$, of the IR camera, wherein the indication scale is partitioned into areas within and outside an actual image content, $C_{low}$ to $C_{high}$, of the captured thermal image, and wherein equally sized temperature intervals have larger geometric sizes in the indication scale for the area within the actual image content than for the area outside the actual image content, $C_{low}$ to $C_{high}$, of the captured thermal image; and
- controlling the display to display said indication scale to a user.

12. The method according to claim 11, further comprising:
- associating the actual image content, $C_{low}$ to $C_{high}$, of the captured thermal image with the indication scale; and
- controlling the display to display said actual image content, $C_{low}$ to $C_{high}$, of the captured thermal image in relation to said indication scale.

13. The method according to claim 11, further comprising:
- associating at least one view parameter setting ($D_{low}$, $D_{high}$; $F_{low}$, $F_{high}$), which determine how the captured thermal image is presented to the user, with said indication scale in the display; and
- controlling the display to display said at least one view parameter setting ($D_{low}$, $D_{high}$); $F_{low}$, $F_{high}$), in relation to said indication scale.

14. The method according to claim 11, further comprising:
- associating a thermal image histogram, which indicates the temperature distribution within the actual image content ($C_{low}$, $C_{high}$) of the captured thermal image, with the actual image content ($C_{low}$, $C_{high}$) of the captured thermal image and the indication scale; and
- controlling the display to display said thermal image histogram in relation to the actual image content ($C_{low}$, $C_{high}$) of the captured thermal image and the indication scale.

15. A non-transitory computer-readable medium encoded with executable instructions for displaying captured thermal images of an IR camera on a display, wherein execution of the instructions by a processor causes the processor to perform a method comprising:
- determining an indication scale comprising a current temperature range, $B_{low}$ to $B_{high}$, of the IR camera, wherein the indication scale is partitioned into areas within and outside an actual image content, $C_{low}$ to $C_{high}$, of the captured thermal image, and wherein equally sized temperature intervals have larger geometric sizes in the indication scale for the area within the actual image content than for the area outside the actual image content, $C_{low}$ to $C_{high}$, of the captured thermal image; and
- controlling the display to display said indication scale to a user.

16. The computer-readable medium according claim 15, wherein the method further comprises:
- associating the actual image content, $C_{low}$ to $C_{high}$, of the captured thermal image with the indication scale; and
- controlling the display to display said actual image content, $C_{low}$ to $C_{high}$, of the captured thermal image in relation to said indication scale.

17. The computer-readable medium according to claim 15, wherein the method further comprises:

associating at least one view parameter setting ($C_{low}$, $D_{high}$; $F_{low}$, $F_{high}$), which determine how the captured thermal image is presented to the user, with said indication scale in the display; and controlling the display to display said at least one view parameter setting ($C_{low}$, $C_{high}$); ($F_{low}$, $F_{high}$) in relation to said indication scale.

18. The computer-readable medium according claim 15, wherein the method further comprises:

associating a thermal image histogram, which indicates the temperature distribution within the actual image content ($C_{low}$, $C_{high}$) of the captured thermal image, with the actual image content ($C_{low}$, $C_{high}$) of the captured thermal image and the indication scale; and controlling the display to display said thermal image histogram in relation to the actual image content ($C_{low}$, $C_{high}$) of the captured thermal image and the indication scale.

19. The computer-readable medium according claim 15, wherein the instructions are stored on a readable storage medium.

\* \* \* \* \*